US012657283B2

(12) United States Patent
Wang et al.

(10) Patent No.: US 12,657,283 B2
(45) Date of Patent: Jun. 16, 2026

(54) PROCESSING METHOD OF REMOTE ATTESTATION REPORT, DATABASE SERVICE END AND DATABASE CLIENT END

(71) Applicant: CLOUD INTELLIGENCE ASSETS HOLDING (SINGAPORE) PRIVATE LIMITED, Singapore (SG)

(72) Inventors: Su Wang, Shanghai (CN); Fang Lu, Shanghai (CN); Yufei Mai, Shanghai (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 16 days.

(21) Appl. No.: 18/852,994

(22) PCT Filed: May 31, 2023

(86) PCT No.: PCT/CN2023/097304
§ 371 (c)(1),
(2) Date: Sep. 30, 2024

(87) PCT Pub. No.: WO2023/232052
PCT Pub. Date: Dec. 7, 2023

(65) Prior Publication Data
US 2025/0232026 A1     Jul. 17, 2025

(30) Foreign Application Priority Data

Jun. 1, 2022    (CN) .......................... 202210623350.8

(51) Int. Cl.
*G06F 7/04* (2006.01)
*G06F 21/52* (2013.01)

(52) U.S. Cl.
CPC ........ *G06F 21/52* (2013.01); *G06F 2221/033* (2013.01)

(58) Field of Classification Search
CPC .... G06F 21/52; G06F 2221/033; G06F 21/50; H04L 9/32
See application file for complete search history.

(56) References Cited

U.S. PATENT DOCUMENTS

| | | | | |
|---|---|---|---|---|
| 12,086,258 B1 * | 9/2024 | Righi | ...................... | G06F 9/542 |
| 12,189,542 B2 * | 1/2025 | Lal | ........................... | G06F 21/76 |

(Continued)

FOREIGN PATENT DOCUMENTS

| | | |
|---|---|---|
| CN | 103748594 A | 4/2014 |
| CN | 109995776 A | 7/2019 |

(Continued)

OTHER PUBLICATIONS

Felde et al, Securing Remote Policy Enforcement by a Multi-Enclave Based Attestation Architecutre, Oct. 22, 2021, IEEE, pp. 102-108. (Year: 2021).*

(Continued)

*Primary Examiner* — Philip J Chea
*Assistant Examiner* — Jenise E Jackson

(57) ABSTRACT

The present disclosure provides a processing method of a remote attestation report, a database service end and a database client end. The method includes: acquiring a request statement related to a remote attestation report from a database client end; executing a preset function corresponding to the request statement to call an interface of a first TEE remote attestation SDK to obtain a processing result related to the remote attestation report; sending the processing result to the database client end. Embodiments of the present disclosure can reduce the difficulty in the development and application of a remote attestation function.

10 Claims, 4 Drawing Sheets

(56)                References Cited

U.S. PATENT DOCUMENTS

| | | | |
|---|---|---|---|
| 2016/0182531 A1 | 6/2016 | Rubakha et al. | |
| 2018/0211034 A1 | 7/2018 | Costa | |
| 2019/0196843 A1* | 6/2019 | Potlapally | G06F 21/575 |
| 2020/0382321 A1* | 12/2020 | Caceres | H04L 63/068 |
| 2021/0111892 A1* | 4/2021 | Vahldiek-Oberwagner | |
| | | | G06F 21/57 |

FOREIGN PATENT DOCUMENTS

| | | | |
|---|---|---|---|
| CN | 110214323 A | 9/2019 | |
| CN | 112433940 A | 3/2021 | |
| CN | 113302893 A | 8/2021 | |
| CN | 113886418 A | 1/2022 | |
| CN | 114996338 A | 9/2022 | |

OTHER PUBLICATIONS

Liu et al, Practical and Efficient in Enclave Verification of Privacy Compliance, Jun. 24, 2021, IEEE, pp. 413-425. (Year: 2021).*

The First Office Action dated Sep. 28, 2024 for Chinese Application No. 202210623350.8.

Notification to Grant Patent Right for Invention for Chinese Patent Application No. 202210623350.8, dated Jul. 29, 2025.

Sun Qianqian, "Research and Implementation of Trusted Data Collection Platform for Internet of Things," China Academic Journal Electronic Publishing House, Jun. 1, 2021.

Lukas Jäger et al., "Rolling DICE—Lightweight Remote Attestation for COTS IoT Hardware," ARES '17: Proceedings of the 12th International Conference on Availability, Reliability and Security, Aug. 29, 2017.

International Search Report and Written Opinion dated Aug. 21, 2023 for International Application No. PCT/CN2023/097304.

* cited by examiner

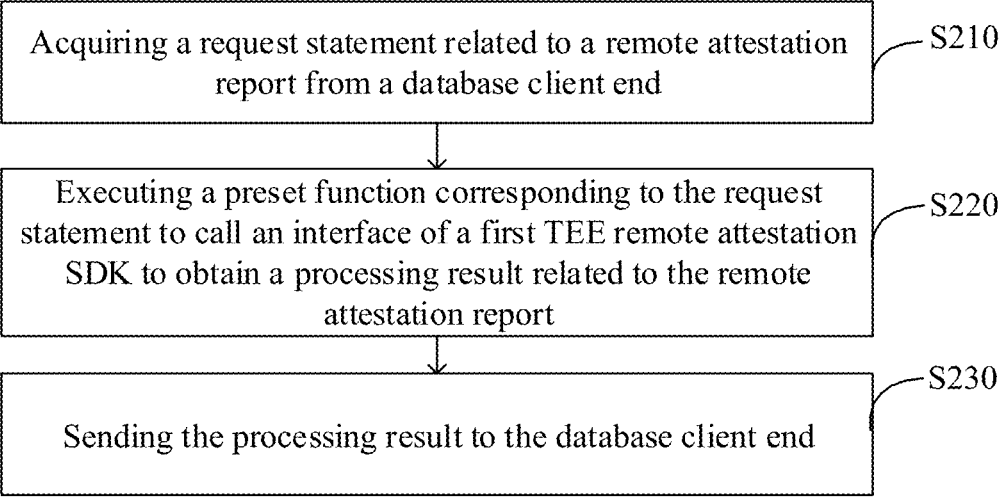

Acquiring a request statement related to a remote attestation report from a database client end ⟋S210

Executing a preset function corresponding to the request statement to call an interface of a first TEE remote attestation SDK to obtain a processing result related to the remote attestation report ⟋S220

Sending the processing result to the database client end ⟋S230

FIG. 2

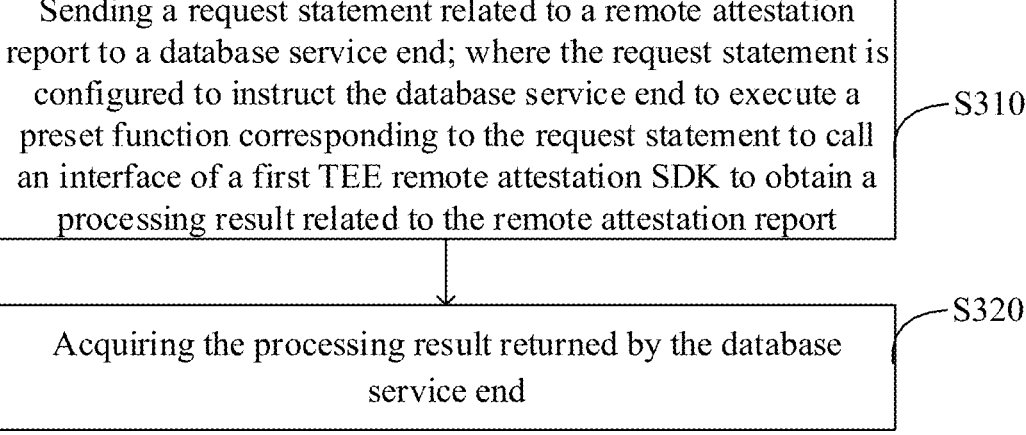

Sending a request statement related to a remote attestation report to a database service end; where the request statement is configured to instruct the database service end to execute a preset function corresponding to the request statement to call an interface of a first TEE remote attestation SDK to obtain a processing result related to the remote attestation report ⟋S310

Acquiring the processing result returned by the database service end ⟋S320

FIG. 3

PROCESSING METHOD OF REMOTE ATTESTATION REPORT, DATABASE SERVICE END AND DATABASE CLIENT END

CROSS-REFERENCE TO RELATED APPLICATIONS

The present disclosure is a National Stage of International Application No. PCT/CN2023/097304, filed on May 31, 2023, which claims the priority to Chinese Patent Application No. 202210623350.8 filed to China National Intellectual Property Administration on Jun. 1, 2022 and titled "Processing method of remote attestation report, database service end and database client end", the entire contents of these applications are incorporated herein by reference.

TECHNICAL FIELD

The present disclosure relates to the field of cloud computing, in particular to a processing method of a remote attestation report, a database service end and a database client end.

BACKGROUND

Remote attestation is an essential technology for confidential computing in a TEE (Trusted Execution Environment). Before using a cloud environment, a user needs to conduct key negotiation and establish a secure and reliable computing environment through remote attestation. At present, the main application direction of cloud confidential computing is the field of privacy computing, that is, analyzing and processing sensitive data in the TEE environment. A data provider and a data user in the privacy computing need to verify a database through a remote attestation technology of confidential computing to ensure data security and authenticity of a calculated result.

In the related technology, the related function of TEE remote attestation is generally implemented by calling a TEE remote attestation SDK (Software Development Kit), which is difficult to develop and apply.

SUMMARY

Embodiments of the present disclosure provide a processing method of a remote attestation report, a database service end and a database client end, so as to solve the problem existing in related technologies, and the technical solution is as follows.

In the first aspect, an embodiment of the present disclosure provides a processing method of a remote attestation report, which is applied to a database service end and includes:

acquiring a request statement related to a remote attestation report from a database client end;

executing a preset function corresponding to the request statement to call an interface of a first TEE remote attestation SDK to obtain a processing result related to the remote attestation report; and sending the processing result to the database client end.

In the second aspect, an embodiment of the present disclosure provides a processing method of a remote attestation report, which is applied to a database client end and includes:

sending a request statement related to a remote attestation report to a database service end; where the request statement is configured to instruct the database service end to use a preset function corresponding to the request statement to call an interface of a first TEE remote attestation SDK to obtain a processing result related to the remote attestation report;

acquiring the processing result returned by the database service end.

In a third aspect, an embodiment of the present disclosure provides a database service end, which includes:

a first acquiring module, configured to acquire a request statement related to a remote attestation report from a database client end;

a first processing module, configured to execute a preset function corresponding to the request statement to call an interface of a first TEE remote attestation SDK to obtain a processing result related to the remote attestation report;

a first sending module, configured to send the processing result to the database client end.

In a fourth aspect, an embodiment of the present disclosure provides a database client end, which includes:

a second sending module, configured to send a request statement related to a remote attestation report to a database service end; where the request statement is configured to instruct the database service end to execute a preset function corresponding to the request statement to call an interface of a first TEE remote attestation SDK to obtain a processing result related to the remote attestation report;

a second acquiring module, configured to acquire the processing result returned by the database service end.

In a fifth aspect, an embodiment of the present disclosure provides a database service end, which includes a memory, a processor and a computer program stored in the memory, and the processor, when executing the computer program, implements the method provided by any one of the embodiments of the present disclosure.

In a sixth aspect, an embodiment of the present disclosure provides a database client end, which includes a memory, a processor and a computer program stored in the memory, and the processor, when executing the computer program, implements the method provided by any one of the embodiments of the present disclosure.

In a seventh aspect, an embodiment of the present disclosure provides a computer-readable storage medium on which storing a computer program which, when executed by a processor, implements the method provided by any one of the embodiments of the present disclosure.

In the technical solution of the embodiment of the present disclosure, a function for calling an interface of a TEE remote attestation SDK is preset in a database service end, so that a database client end can trigger the function with a corresponding request statement to implement calling the interface of the TEE remote attestation SDK. That is to say, a preset function interface is encapsulated on the underlying TEE remote attestation SDK for a user to call and execute through the request statement corresponding to the function. There is no need for the database client end to use the TEE function primitive defined by a specific hardware vendor to call the interface of the TEE remote attestation SDK, thus reducing the difficulty in the development and application of the remote attestation function.

The above summary is for the purpose of illustration only and is not intended to be limiting in any way. In addition to the schematic aspects, implementations and features described above, further aspects, implementations and features of the present disclosure will be easily understood by referring to the drawings and the following detailed description.

BRIEF DESCRIPTION OF DRAWINGS

In the drawings, unless otherwise specified, the same reference numeral throughout several drawings refers to the same or similar component or element. The drawings are not necessarily drawn to scale. It should be understood that these drawings depict only some implementations disclosed in accordance with the present disclosure and should not be considered as limiting the scope of the present disclosure.

FIG. 2 is a flowchart of a processing method of a remote attestation report according to an embodiment of the present disclosure.

FIG. 3 is a flowchart of a processing method of a remote attestation report according to another embodiment of the present disclosure.

DESCRIPTION OF EMBODIMENTS

In the following, only some exemplary embodiments are simply described. As can be recognized by those skilled in the art, the described embodiments can be modified in various ways without departing from the spirit or scope of the present disclosure. Accordingly, the drawings and description are to be regarded as illustrative in essence and not restrictive.

In order to more clearly show a processing method of a remote attestation report provided in an embodiment of the present disclosure, the application scenario of the method is first introduced.

For example, a processing method of a remote attestation report in an embodiment of the present disclosure can be applied to a privacy computing scenario, that is, sensitive data analysis and processing in a TEE environment. In the privacy computing scenario, multiple participants conduct joint analysis and joint machine learning etc. on their data through cooperation without revealing their own data, where the multi-party data are transmitted encrypted and stored in the TEE, and a database engine provides SQL (Structured Query Language) query function in the TEE, and the confidentiality and availability-invisible of the multi-party data are implemented by the TEE.

Figure 1:
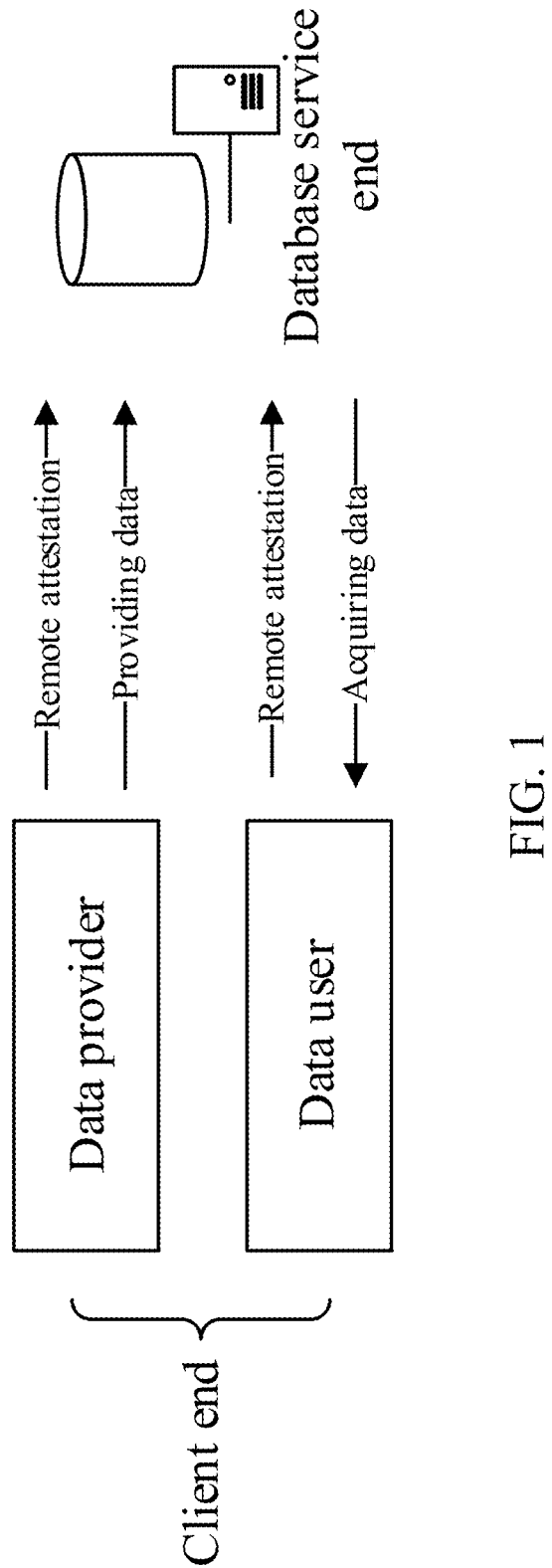
FIG. 1 is a schematic diagram of a privacy computing scenario for implementing a processing method of a remote attestation report according to an embodiment of the present disclosure.

FIG. 1 shows a schematic diagram of a privacy computing scenario. As shown in FIG. 1, the privacy computing scenario includes a database client end and a database service end.

The database service end is configured to control a database of privacy calculation, that is, the database service end is a database control backend. In the database service end, a database engine is configured based on the TEE technology to provide the SQL query function. Specifically, based on the TEE technology, a physically isolated code running environment, such as an enclave, is created in the database service end. The database engine runs in this environment. The database client end provides data for the database or acquires data in the database. For example, the database client end can be a data provider or a data user.

In practical application, the database client end needs to perform remote attestation to the database engine in the database service end, where the remote attestation refers to a technology that a computing system (prover) proves its software/hardware configuration and status to a remote system (verifier).

For example, a data provider needs to perform remote attestation to the database engine in the TEE to establish trust, so as to protect their own data security. A data user needs to perform remote attestation to the database engine in the TEE to determine the authenticity of the data. Specifically, the data provider or data user can initiate remote attestation to the database service end to acquire/verify a remote attestation report, and determine the software/hardware configuration and status of the database engine with the remote attestation report, thus establishing trust.

A TEE remote attestation SDK provides the related function of TEE remote attestation. Generally, a developer needs to call the function primitive defined by a specific vendor to call an interface of the TEE remote attestation SDK. For example, in some scenarios, it is necessary to use compiled language C/C++ to call the interface, which cannot meet the online editing and debugging requirement of a client end, thus increasing the difficulty in the development and application of the remote attestation function.

A technical solution of an embodiment of the present disclosure is mainly to solve the above technical problem. In order to understand the characteristic and technical content of the embodiment of the present disclosure in more detail, the implementation of the embodiment of the present disclosure is described in detail with the attached drawings, and the attached drawings are for reference only and are not used to limit the embodiment of the present disclosure.

FIG. 2 shows a flowchart of a processing method of a remote attestation report according to an embodiment of the present disclosure. As shown in FIG. 2, the method may include:

S210, acquiring a request statement related to a remote attestation report from a database client end;

S220, executing a preset function corresponding to the request statement to call an interface of a first TEE remote attestation SDK to obtain a processing result related to the remote attestation report;

S230, sending the processing result to the database client end.

The above method can be applied to a database service end, such as the database service end shown in FIG. 1. In an implementation, an extension module can be created based on the extension capability of a database engine in the database service end, and the above method can be implemented with the extension module. Illustratively, the extension module is configured to dock the database client end and receive the request statement. In addition, the preset function is set in the extension module, and the preset function is configured to call the interface of the first TEE remote attestation SDK. That is to say, the above method can be implemented based on the extension capability of the database engine, and the interface of the TEE remote attestation SDK can be called by triggering the preset function.

Illustratively, the database engine in the database service end may include a PostgreSQL database engine or SQLite database engine supporting extension.

In an embodiment of the present disclosure, the remote attestation report is configured to prove the execution environment of the database engine. Illustratively, the remote attestation report can be obtained based on physical version information, software version information, running environment information of a trusted container (e.g. enclave), a measurement value, etc. of a CPU. The client end can determine whether the execution environment of the database engine is trustable through the remote attestation report. For example, by verifying the remote attestation report, it is determined that the execution environment of the database engine is trustable if the verification passes, and it is determined that the execution environment of the database engine is not trustable if the verification fails.

Illustratively, the request statement related to a remote attestation report is configured to indicate the processing requirement of the database client end for the remote attestation report. The processing requirements may include acquiring a remote attestation report, verifying the remote attestation report, etc. Accordingly, the request statement in the embodiment of the present disclosure may include a report generation statement for acquiring a remote attestation report and/or a report verification statement for verify-ing a remote attestation report. In the embodiment of the present disclosure, the preset function corresponding to the request statement may be a function provided by an expan-sion capability/extension module based on the database engine and configured for realizing the related processing process of the remote attestation report. Illustratively, the preset function may include a remote attestation generation function (RaQuoteGenerate) corresponding to the report generation statement, and/or a remote attestation verification function (RaQuoteVerify) corresponding to the report veri-fication statement.

In the embodiment of the present disclosure, the request statement is configured to trigger the preset function. By configuring the preset function, the interface language of the function can be used to write the request statement for the database client end, which is convenient for the client end to use the related function of remote attestation. Illustratively, the request statement can be written in an interpreted lan-guage. Specifically, by configuring the preset function as a function that can be triggered by the interpreted language, the database client end can acquire the processing result related to the remote attestation report by using the request statement written by the interpreted language. Because the interpreted language does not need pre-compilation before running, it is easier to edit, modify and debug, which can reduce the difficulty in the application. For example, the preset function can be SQL UDF (User-defined Functions), and the request statement can be SQL statement, thus providing an interface related to a remote attestation with a SQL UDF function that can be understood by a user. That is, no matter what interface the TEE remote attestation SDK on the database service end uses, it is encapsulated as a unified function interface to shield the differences of the underlying programming languages.

Specifically, the report generation statement can indicate the remote attestation generation function, and the report verification statement can indicate the remote attestation verification function, so that the database service end can accurately realize the corresponding function. For example, the report generation statement can be a SQL statement "SELECT RaQuoteGenerate (challengeNumber) as Report"

(select the remote attestation generation function to obtain the report), and the report verification statement can be a SQL statement "SELECT RaQuoteVerify (ra_report) (select the remote attestation verification function)".

In the embodiment of the present disclosure, the first TEE remote attestation SDK can be a native SDK provided by a TEE hardware vendor, and is configured to provide the processing capability related to a remote attestation report, such as generating a remote attestation report and/or veri-fying a remote attestation report. According to the step S220, the preset function is configured to call the interface of the first TEE remote attestation SDK, so as to acquire the processing result related to the remote attestation report, for example, to obtain the result of generating the remote attestation report (i.e., obtain the remote attestation report) or to obtain the verification result of the remote attestation report (i.e., obtain indication information of whether the verification is passed or not).

According to the above description, in some sample scenarios, by executing the SQL statement at the client end and executing by the database service end the corresponding SQL UDF based on the SQL statement acquired by a SQL execution gateway and calling the TEE remote attestation SDK in the function implementation, the related processing result of the remote attestation report can be acquired by a user based on the SQL statement.

It can be seen that the method provided by the embodi-ment of the present disclosure shields the underlying imple-mentation details of the SDK through the preset function calling the interface of the TEE remote attestation SDK, that is, encapsulating the underlying TEE remote attestation SDK as a user interface in the form of a function, which can be called and executed for a user through the statement corresponding to the function. It is beneficial to implement that a TEE remote attestation function is called through the interpreted language, and the code logic can be modified online without pre-compilation, thus reducing the difficulty in the development and application of the remote attestation function.

In an implementation, in an exemplary implementation, the step S220, the executing a preset function corresponding to the request statement to call an interface of a first TEE remote attestation SDK to obtain a processing result related to the remote attestation report includes:

executing a remote attestation generation function corre-sponding to the report generation statement to call the interface of the first TEE remote attestation SDK to obtain a remote attestation report returned by the inter-face; where the first TEE remote attestation SDK is configured to generate the remote attestation report based on an execution environment of a database engine in a database service end.

This exemplary implementation describes the process of acquiring a remote attestation report based on the report generation statement. The remote attestation generation function is configured to acquire the remote attestation report through the interface of the TEE remote attestation SDK. Illustratively, the above process can specifically include: creating a user table for storing the remote attesta-tion report; calling the interface of the first TEE remote attestation SDK with the remote attestation generation func-tion to obtain the generated remote attestation report, and inserting the remote attestation report into the table to provide the remote attestation report in the form of the user table.

In an implementation, the remote attestation report may be a report with a preset data type. For example, the data type of the remote attestation report is a ByteArray (BYTEA) or a binary data block (BLOB). Specifically, for a PostgreSQL database, the data type of the remote attestation report is BYTEA. For an SQLite database, the data type of the remote attestation report is BLOB. By defining a data type to describe the data structure of the remote attestation report, it is convenient for a user/client end to store and export the remote attestation report, and it is convenient for a user/client end to analyze and verify the remote attestation report themselves.

In an implementation, in an exemplary implementation, the step S220, the executing a preset function corresponding to the request statement to call an interface of a first TEE remote attestation SDK to obtain a processing result related to the remote attestation report further includes:

executing a remote attestation verification function corresponding to a report verification statement to call the interface of the first TEE remote attestation SDK to obtain a verification result for the remote attestation report returned by the interface; where the first TEE remote attestation SDK is configured to verify the remote attestation report.

The verified remote attestation report can be a remote attestation report obtained by using the remote attestation generation function. That is to say, after acquiring a remote attestation report, the remote attestation report can be verified on the database service end by executing the report verification statement, so there is no need to perform verification at the client end. In specific implementation, the remote attestation report can be verified by verifying data integrity of the remote attestation report. For example, the first TEE remote attestation SDK generates a remote attestation report based on a random parameter and the execution environment of the database engine, and the remote attestation report can be verified by judging whether the remote attestation report contains a complete random parameter.

Illustratively, the verification result for the remote attestation report can be structured indication information, for example, 0 indicates that the verification passed, and non-0 indicates that the verification failed. In this way, the underlying verification process is shielded, and a user can directly read the verification result.

In an implementation, the remote attestation report can be generated with a preset data type such as BYTEA or BLOB, so that the remote attestation report can be verified without calling the first TEE remote attestation SDK. For example, the remote attestation report is verified by using a data verification function/module of the database engine to obtain the verification result of the remote attestation report.

For the client end, it can acquire an execution result related to the remote attestation report by executing the request statement, such as acquiring a remote attestation report or acquiring a verification result of a remote attestation report. In an implementation, the client end can also verify the remote attestation report by itself. Specifically, an embodiment of the present disclosure also provides a processing method of a remote attestation report, as shown in FIG. 3, which is applied to a database client end, and the method includes:

S310, sending a request statement related to a remote attestation report to a database service end; where the request statement is configured to instruct the database service end to execute a SQL function corresponding to the request statement to call an interface of a first TEE remote attestation SDK to obtain a processing result related to the remote attestation report;

S320, acquiring the processing result returned by the database service end.

In one example, the request statement includes a report generation statement for acquiring the remote attestation report; the processing result includes a remote attestation report generated based on an execution environment of a database engine in the database service end. That is, the client end sends the report generation statement to the database service end by executing the report generation statement, and the database service end calls the interface of the first TEE remote attestation SDK by using a function indicated by the report generation statement, thus obtaining the remote attestation report generated by the first TEE remote attestation SDK based on the current execution environment of the database engine, and returning the remote attestation report to the database client end.

In an implementation, the database client end can choose to verify the remote attestation report in the database service end, and can also choose to verify the remote attestation report in the database client end.

Illustratively, the above method may further include:

calling an interface of a second TEE remote attestation SDK to obtain a verification result for the remote attestation report returned by the interface; where the second TEE remote attestation SDK is configured to verify the remote attestation report.

The second TEE remote attestation SDK can be a native SDK provided by a TEE hardware vendor which is deployed on the database client end and can be configured to verify the remote attestation report. In other words, the database client end can verify a remote attestation report by itself by calling an interface of a native SDK.

Illustratively, the above method may further include:

verifying the remote attestation report with a data verification module in the database client end to obtain a verification result for the remote attestation report.

The remote attestation report can be a report with a preset data type, so that the database client end can verify the remote attestation report with the data verification module, that is, the data verification function of the database itself.

The specific implementation of each information applied in the above method can refer to the technical details of the above embodiment, and will not be repeated here.

Figure 4:
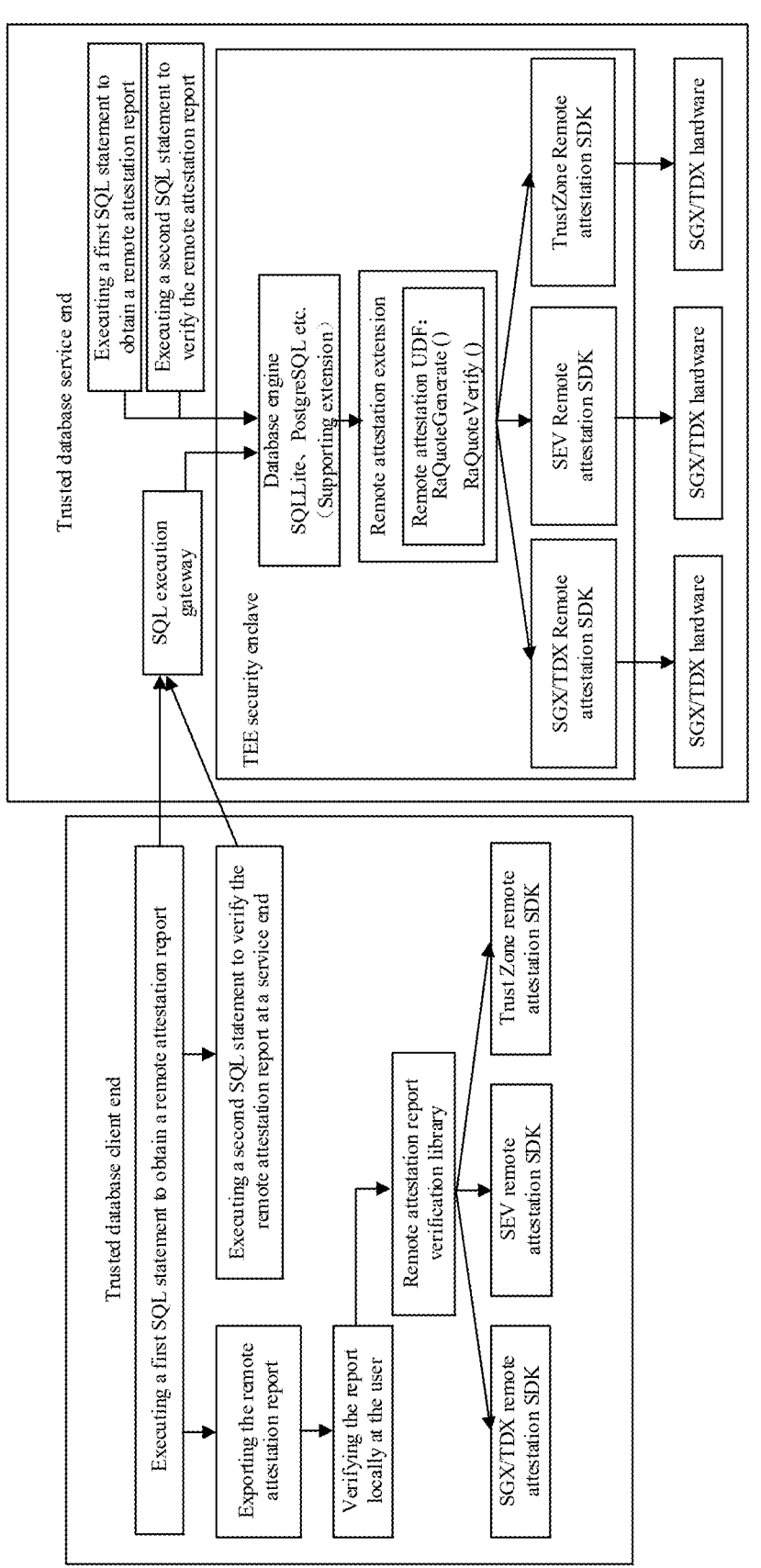
FIG. 4 is an overall architecture diagram of a processing method of a remote attestation report according to an embodiment of the present disclosure.

In order to more clearly present a technical idea of a processing method of a remote attestation report provided by an embodiment of the present disclosure, a specific application example is provided by taking SQL statement as an example. FIG. 4 shows an overall architecture diagram of the present disclosure example. As shown in FIG. 4, a trusted database client end can acquire a remote attestation report by executing a first SQL statement (report generation statement), and an SQL execution gateway in a trusted database service end receives the first SQL statement and transmits the SQL statement to a TEE security enclave. In the TEE security enclave, there is a remote attestation extension module created based on extension capability of a database engine, which provides a remote attestation UDF. The remote attestation UDF can call various interfaces of TEE remote attestation SDKs, including interfaces of TEE remote attestation SDKs corresponding to TEEs provided by different hardware. The TEEs provided by different hardware are, for example, SGX (Software Guard Extensions), TDX (Trust Domain Extension), SEV (Secure Encrypted Virtualization), TrustZone, etc. A remote attestation report can be obtained by calling an interface of a TEE remote attestation SDK. On the basis of acquiring a remote attestation report, the trusted database client end can export the remote attestation report and verify the report locally at the user, or can verify the remote attestation report at the service end by executing a second SQL statement (report verification statement). The process of verifying the remote attestation report at the service end is similar to the above-mentioned process of acquiring a remote attestation report, which both are triggered by an SQL statement and implemented based on an SQL UDF, so it will not be repeated here. The verifying the report locally at the user can be implemented through a remote attestation report verification library, which can call an interface of each TEE remote attestation SDK.

Specifically, the technical details of the present disclosure example can be referred to the following description.

In the first aspect of the present disclosure example, a new data type is defined to describe a remote attestation report.

Specifically, a data type of a remote attestation report (RA_REPORT) is defined as follows:

(1) in a PostgreSQL database, the data type of the RA_REPORT is defined as BYTEA (ByteArray).

(2) In an SQLite database, the data type of the RA_REPORT is defined as BLOB (binary data block).

The second aspect of the present disclosure example is to create remote attestation extension to provide a remote attestation SQL UDF.

Specifically, the remote attestation SQL UDF includes:

(1) a remote attestation generation function: RaQuoteGenerate (BYTEA challenge_data);

In the implementation of this function, an interface of a TEE remote attestation SDK is called to implement the generation of a remote attestation report and the remote attestation report with a data type of RA_REPORT is returned.

(2) a remote attestation verification function: int RaQuote Verify (RA_REPORT);

In the implementation of this function, an interface of a TEE remote attestation SDK is called to implement the verification of the remote attestation report and a verification result is returned.

The verification result of 0 indicates that the verification passed, and the verification result of non-0 indicates that the verification failed/is not passed.

In the third aspect of the present disclosure example, taking PostgreSQL syntax as an example, an example of acquiring a remote attestation report and verifying the remote attestation report is provided as follows:

(1) acquiring a remote attestation report includes the following steps: creating a user table to store a remote attestation report;

generating a remote attestation report and inserting the remote attestation report into the table.

(2) verifying the remote attestation report can be implemented by executing a SQL statement "SELECT RaQuote Verify(ra_report) as VerificationResult".

In the fourth aspect of the present disclosure example, a user can read RA_REPORT data and verify the remote attestation report by himself/herself, which includes implementing the verification with a native SDK provided by a TEE vendor or with a data verification function of a database.

In the above application examples, a TEE remote attestation function is encapsulated in an extension with extension capability of a database engine, and an interface for the generation and verification of a remote attestation report are provided in the form of SQL UDF function for a user to call and execute in an SQL statement, and a new data type is defined to describe the data structure of the remote attestation report for a user to store and export the remote attestation report. It can be seen that the above application examples integrate the characteristic of interpreted language, and the code logic can be modified online without pre-compilation, thus easier to develop and debug.

Figure 5:
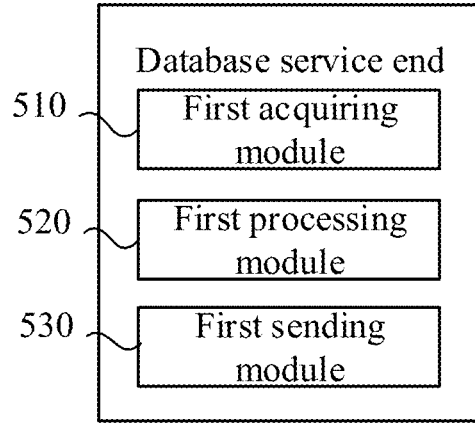
FIG. 5 is a structural block diagram of a database service end according to an embodiment of the present disclosure.

Corresponding to method application scenarios and methods provided by embodiments of the present disclosure, an embodiment of the present disclosure also provides a database service end. Referring to FIG. 5, the database service end may include:

a first acquiring module 510, configured to acquire a request statement related to a remote attestation report from a database client end;

a first processing module 520, configured to execute a preset function corresponding to the request statement to call an interface of a first TEE remote attestation SDK to obtain a processing result related to the remote attestation report;

a first sending module 530, configured to send the processing result to the database client end.

In an implementation, the first processing module 520 is specifically configured to:

execute a remote attestation generation function corresponding to a report generation statement to call an interface of a first TEE remote attestation SDK to obtain a remote attestation report returned by the interface; where the first TEE remote attestation SDK is configured to generate the remote attestation report based on an execution environment of a database engine in the database service end.

In an implementation, a data type of the remote attestation report is a ByteArray or a binary data block.

In an implementation, the first processing module 520 is specifically configured to:

execute a remote attestation verification function corresponding to a report verification statement to call an interface of a first TEE remote attestation SDK to obtain a verification result for the remote attestation report returned by the interface; where the first TEE remote attestation SDK is configured to verify the remote attestation report.

The function of each module can refer to the corresponding description in the above method, and has corresponding beneficial effect, which is not repeated here.

Figure 6:
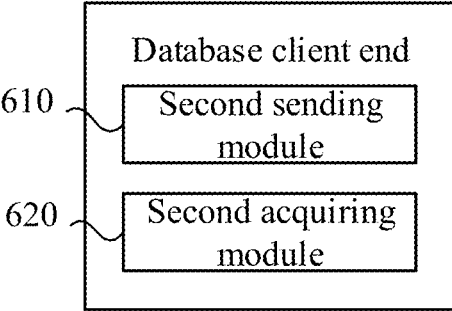
FIG. 6 is a structural block diagram of a database client end according to an embodiment of the present disclosure.

An embodiment of the present disclosure also provides a database client end. Referring to FIG. 6, the database client end may include:

a second sending module 610, configured to send a request statement related to a remote attestation report to a database service end; where an SQL statement is configured to instruct a database service end to execute a preset function corresponding to the request statement, so as to call an interface of a first TEE remote attestation SDK to obtain a processing result related to the remote attestation report;

a second acquiring module 620, configured to acquire the processing result returned by the database service end.

In an implementation, the request statement includes a report generation statement for acquiring a remote attestation report; the processing result include a remote attestation report generated based on an execution environment of a database engine in the database service end.

In an implementation, the database client end may further include:

a second processing module, configured to call an interface of a second TEE remote attestation SDK to obtain a verification result for the remote attestation report returned by the interface; the second TEE remote attestation SDK is configured to verify the remote attestation report.

In an implementation, the database client end may further include:

a third processing module, configured to verify the remote attestation report with a data verification module in the database client end to acquire a verification result for the remote attestation report.

The function of each module can refer to the corresponding description in the above method, and has corresponding beneficial effect, which is not repeated here.

Figure 7:
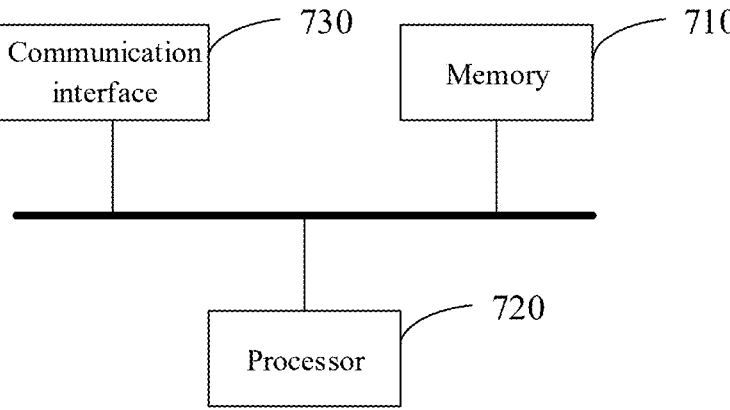
FIG. 7 is a structural block diagram of an electronic device for implementing a processing method of a remote attestation report according to an embodiment of the present disclosure.

An embodiment of the present disclosure also provides an electronic device for implementing the above method. The electronic device is, for example, the above database service end or the above database client end. FIG. 7 shows a structural block diagram of an electronic device according to an embodiment of the present disclosure. As shown in FIG. 7, the electronic device includes a memory 710 and a processor 720, and a computer program executable on the processor 720 is stored in the memory 710. When the processor 720 executes the computer program, the processing method of the remote attestation report in the above embodiment is implemented. The number of the memory 710 and the processor 720 may be one or more.

The electronic device further includes:

a communication interface 730, configured to communicate with an external device and carry out interactive data transmission.

If the memory 710, the processor 720, and the communication interface 730 are independently implemented, the memory 710, the processor 720, and the communication interface 730 can be connected to each other through a bus and perform communication with each other. The bus can be an industry standard architecture (ISA) bus, a peripheral component interconnect (PCI) bus or an extended industry standard architecture (EISA) bus. The bus can be divided into an address bus, a data bus and a control bus, etc. For the convenience of representation, only a thick line is indicated in FIG. 7, but it does not mean that there is only one bus or one type of bus.

In an implementation, in practical implementation, if the memory 710, the processor 720 and the communication interface 730 are integrated on one chip, the memory 710, the processor 720 and the communication interface 730 can communicate with each other through an internal interface.

An embodiment of the present disclosure also provides a computer-readable storage medium, which stores a computer program which, when executed by a processor, implements the method provided in any one of the embodiments of the present disclosure.

An embodiment of the present disclosure also provides a computer program product including a computer program which, when executed by a processor, implements the method provided in any one of the embodiments of the present disclosure.

An embodiment of the present disclosure also provides a chip, which includes a processor configured to call and run an instruction stored in a memory, so that a communication device with the chip executes the method provided by embodiments of the present disclosure.

The embodiment of the present disclosure also provides a chip, which includes an input interface, an output interface, a processor and a memory, where the input interface, output interface, the processor and the memory are connected through an internal connection path; the processor is configured to execute a code in the memory, and when the code is executed, the processor is configured to execute the method provided by embodiments of the present disclosure.

It should be understood that the above processor can be a central processing unit (CPU), other general-purpose processors, a digital signal processing (DSP), an application specific integrated circuit (ASIC), a field programmable gate array (FPGA) or other programmable logic equipment, a discrete gate or transistor logic equipment, a discrete hardware component, etc. The general-purpose processor can be a microprocessor or any conventional processor, etc. It is worth noting that the processor can be a processor supporting advanced RISC machines (ARM) architecture.

In a further implementation, the above memory may include a read-only memory and a random access memory, and may also include a nonvolatile random access memory. The memory may be a volatile memory or a nonvolatile memory, or may include both volatile and nonvolatile memories. The nonvolatile memory may include a read-only memory (ROM), a programmable read-only memory (PROM), an erasable programmable read-only memory (Erasable PROM, EPROM), an electrically erasable programmable read-only memory (Electrically EPROM, EEPROM) or a flash memory. The volatile memory may include a random access memory (RAM), which is configured as an external cache. By way of example, but not limitation, many forms of RAM are available. For example, a static random access memory (Static RAM, SRAM), a dynamic random access memory (DRAM), a synchronous dynamic random access memory (Synchronous DRAM, SDRAM), a Double Data Rate synchronous dynamic random access memory (Double Data Rate SDRAM, DDR SDRAM), an enhanced synchronous dynamic random access memory (Enhanced SDRAM, ESDRAM), a synchronous link dynamic random access memory (Sync Link DRAM, SLDRAM) and a direct memory bus random access memory (Direct Rambus RAM, DR RAM).

In the above embodiments, it can be implemented in whole or in part by software, hardware, firmware or any combination thereof. When implemented in software, it can be implemented in whole or in part by a computer program product. The computer program product includes one or more computer instructions. When computer program instructions are loaded and executed on a computer, the process or function according to the present disclosure are generated in whole or in part. The computer can be a general-purpose computer, a special-purpose computer, a computer network, or other programmable device. The computer instruction can be stored in a computer-readable storage medium or transmitted from one computer-readable storage medium to another.

In the description of this specification, descriptions referring to the terms "an embodiment", "some embodiments", "example", "specific example" or "some examples" mean that a specific feature, structure, material or characteristic described in connection with this embodiment or example are included in at least one embodiment or example of the present disclosure. Moreover, the specific feature, structure, material or characteristic described may be combined in any one or more embodiments or examples in a suitable manner. In addition, those skilled in the art can combine and put together different embodiments or examples and features of different embodiments or examples described in this specification without contradicting each other.

In addition, the terms "first" and "second" are only used for a descriptive purpose, and cannot be understood as indicating or implying relative importance or implicitly indicating the number of indicated technical feature. Therefore, the feature defined as "first" and "second" can explicitly or implicitly include at least one of these features. In the description of the present disclosure, "plural" means two or more, unless otherwise specifically defined.

Any process or method description in a flowchart or otherwise described herein can be understood as a module, segment or part of code that represents one or more executable instructions for implementing a specific logical function or step of the process. The scope of the preferred embodiments of the present disclosure include other implementations in which functions may be performed out of the order shown or discussed, including in a substantially simultaneous manner or in the reverse order according to the functions involved.

A logic and/or step represented in a flowchart or described in other ways herein, for example, can be regarded as a sequenced list of executable instructions for implementing a logical function, and can be embodied in any computer-readable medium for use by or in combination with an instruction execution system, an apparatus or a device (such as a computer-based system, a system including a processor or other systems that can fetch instructions from and execute instructions from the instruction execution system, the apparatus or the device).

It should be understood that various parts of the present disclosure can be implemented in hardware, software, firmware or a combination thereof. In the above embodiments, a plurality of steps or methods can be implemented by a software or a firmware stored in a memory and executed by an appropriate instruction execution system. All or part of the steps of the method in the above embodiment can be completed by instructing related hardware through a program, which can be stored in a computer-readable storage medium, and when the program is executed, it includes one or a combination of the steps of the method embodiment.

In addition, each functional unit in each embodiment of the present disclosure can be integrated in one processing module, or each unit can exist physically alone, or two or more units can be integrated in one module. The above integrated module can be implemented in the form of hardware or a software functional module. If the above-mentioned integrated module is implemented in the form of a software functional module and sold or used as an independent product, it can also be stored in a computer-readable storage medium. The storage medium can be a read-only memory, a magnetic disk or an optical disk, etc.

The above are only the specific implementations of the present disclosure, but the protection scope of the present disclosure is not limited to this. Any person familiar with this technical field can easily think of various changes or substitutions within the technical scope disclosed in the present disclosure, which should be included in the protection scope of the present disclosure. Therefore, the protection scope of the present disclosure should be subject to the protection scope of the claims.

The invention claimed is:

1. A processing method of a remote attestation report, applied to a database service end, comprising:
acquiring a request statement related to a remote attestation report from a database client end;
executing a preset function corresponding to the request statement to call an interface of a first (trusted execution environment (TEE) remote attestation software development kit (SDK) to obtain a processing result related to the remote attestation report; and
sending the processing result to the database client end;

wherein in the case that the request statement comprises a report generation statement for acquiring a remote attestation report; the executing a preset function corresponding to the request statement to call an interface of a first TEE remote attestation SDK to obtain a processing result related to the remote attestation report comprises:
executing a remote attestation generation function corresponding to the report generation statement to call the interface of the first TEE remote attestation SDK to obtain a remote attestation report returned by the interface; wherein the first TEE remote attestation SDK is configured to generate the remote attestation report based on an execution environment of a database engine in the database service end.

2. The method according to claim 1, wherein a data type of the remote attestation report is a ByteArray or a binary data block.

3. The method according to claim 1, wherein in the case that the request statement comprises a report verification statement for requesting verification of a remote attestation report; the executing a preset function corresponding to the request statement to call an interface of a first TEE remote attestation SDK to obtain a processing result related to the remote attestation report comprises:
executing a remote attestation verification function corresponding to the report verification statement to call the interface of the first TEE remote attestation SDK to obtain a verification result for the remote attestation report returned by the interface; wherein the first TEE remote attestation SDK is configured to verify the remote attestation report.

4. The method according to claim 1, wherein the request statement is an SQL statement and the preset function is an SQL user-defined function.

5. A non-transitory computer-readable storage medium on which storing a computer program which, when executed by a processor, implements the method according to claim 1.

6. The method according to claim 1, wherein the request statement is an structured query language (SQL) statement and the preset function is an SQL user-defined function.

7. The method according to claim 2, wherein the request statement is an SQL statement and the preset function is an SQL user-defined function.

8. The method according to claim 3, wherein the request statement is an SQL statement and the preset function is an SQL user-defined function.

9. A database service end, comprising a memory, a processor and a computer program stored in the memory, wherein the processor, when executing the non-transitory computer program, implements the following operations:
acquiring a request statement related to a remote attestation report from a database client end;
executing a preset function corresponding to the request statement to call an interface of a first TEE remote attestation SDK to obtain a processing result related to the remote attestation report; and
sending the processing result to the database client end;
wherein in the case that the request statement comprises a report generation statement for acquiring a remote attestation report; the processor, when executing the non-transitory computer program, further implements the following operations:
executing a remote attestation generation function corresponding to the report generation statement to call the interface of the first TEE remote attestation SDK to obtain a remote attestation report returned by the interface; wherein the first TEE remote attestation SDK is configured to generate the remote attestation report based on an execution environment of a database engine in the database service end.

10. The database service end according to claim 9, wherein in the case that the request statement comprises a report verification statement for requesting verification of a remote attestation report; the processor, when executing the computer program, further implements the following operations:

executing a remote attestation verification function corresponding to the report verification statement to call the interface of the first TEE remote attestation SDK to obtain a verification result for the remote attestation report returned by the interface; wherein the first TEE remote attestation SDK is configured to verify the remote attestation report.

\* \* \* \* \*